(12) United States Patent
Higuchi et al.

(10) Patent No.: US 8,088,487 B2
(45) Date of Patent: Jan. 3, 2012

(54) METAL NANOPARTICLES, AN ELECTRODE USING THEM AND A PROCESS OF PREPARING METAL NANOPARTICLES

(75) Inventors: Masayoshi Higuchi, Tsukuba (JP); Ryo Shomura, Tsukuba (JP); Dirk G. Kurth, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 12/451,358

(22) PCT Filed: May 8, 2008

(86) PCT No.: PCT/JP2008/058897
§ 371 (c)(1),
(2), (4) Date: Mar. 30, 2010

(87) PCT Pub. No.: WO2008/140109
PCT Pub. Date: Nov. 20, 2008

(65) Prior Publication Data
US 2010/0184971 A1    Jul. 22, 2010

(30) Foreign Application Priority Data
May 9, 2007  (JP) ................................. 2007-124914

(51) Int. Cl.
*B32B 5/66*  (2006.01)
(52) U.S. Cl. ........ 428/403; 428/404; 428/405; 428/407; 427/212
(58) Field of Classification Search .................. 428/404, 428/405, 407, 403; 427/212
See application file for complete search history.

(56) References Cited

U.S. PATENT DOCUMENTS
2009/0075815 A1*  3/2009  Kaneda et al. ................ 502/339

FOREIGN PATENT DOCUMENTS

| EP | 2153920 | * | 9/2007 |
| JP | 2004-189949 | | 7/2004 |
| JP | 2007-127573 | | 5/2007 |
| WO | WO 2004/076531 | | 9/2004 |
| WO | WO2004/076531 | * | 9/2004 |

* cited by examiner

*Primary Examiner* — Leszek Kiliman
(74) *Attorney, Agent, or Firm* — Manabu Kanesaka

(57) ABSTRACT

An object of the invention is to modify the surface of a metal nanoparticle with a cyclic phenylazomethine having a multi-ion sensing capability, thereby making the sensing of multiple substances possible.

The metal nanoparticles of the invention are characterized by being modified with a cyclic phenylazomethine compound having a structure represented by Chemical Formula 1.

(Chemical Formula 1)

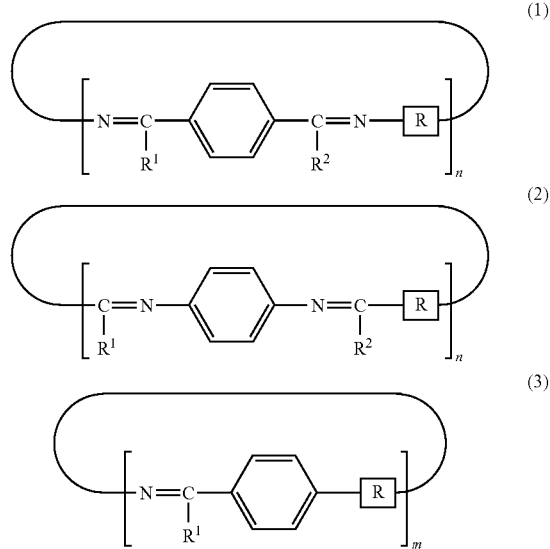

6 Claims, 6 Drawing Sheets

Fig. 1

500 ml Recovery Flask
← Gold Chloride (HAuCl₄ · 3H₂O) 78.8 mg/Water 60 ml
← Tetraoctylammonium Bromide 218.7 mg/Toluene 60 ml The aqueous layer turns into colorless
The organic layer turns into orange.

← Cyclic Phenylazomethine 30mg/Toluene 120 ml 10-minute stirring

← Hydrogenated Boron Sodium 75.7 mg/Water 60 ml

The organic layer turns into purple.

12-hour or longer, vigorous stirring

Extraction of the Organic Layer
↓
Filtration
↓
Concentration plus drying
↓
Cyclic Phenylazomethine-Modified Gold Nanoparticle (1) Cyclic phenylazomethine (2) Cyclic phenylazomethin-modified gold nanoparticles

METAL NANOPARTICLES, AN ELECTRODE USING THEM AND A PROCESS OF PREPARING METAL NANOPARTICLES

ART FIELD

The present invention relates generally to a metal nanoparticle having a nano-level particle diameter, and more specifically to a metal nanoparticle modified with an organic compound, an electrode using the same, and a process of preparing metal nanoparticles.

BACKGROUND ART

Conventional sensing materials are only capable of detecting one type of desired substance because the surfaces of metal nanoparticles are modified with such a substance as being complementarily coupled to the substance to be detected (see Patent Publications 1 and 2).

Patent Publication 1: JP(A) 2005-328809
Patent Publication 2: JP(A) 2005-181296

DISCLOSURE OF THE INVENTION

Problem to be Solved by the Invention

Such being the situations, an object of the invention is to modify the surfaces of metal nanoparticles with a cyclic phenylazomethine having a multi-ion sensing capability, thereby enabling multiple substances to be sensed.

Means for Solving the Problem

According to the first aspect of the invention, there is a metal nanoparticle provided, which is characterized by being modified by a cyclic phenylazomethine compound having a structure represented by Chemical Formula 1.

(Chemical Formula 1)

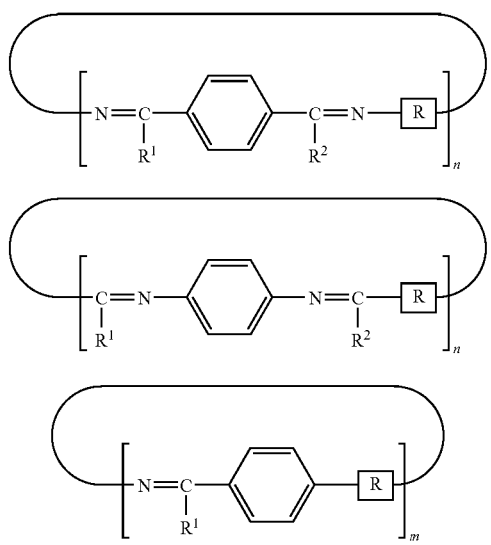

That cyclic phenylazomethine compound is at least one compound selected from the group consisting of formulae (1), (2) and (3) including imine and a benzene ring. Here $R^1$ and $R^2$ that may be identical or different are a hydrogen atom or an aryl or alkyl group with or without a substituent; n is an integer of 2 or greater indicative of the degree of polymerization; m is an integer of 3 or greater indicative of the degree of polymerization; and R is a spacer that directly connects imines together in formulae (1) and (2), makes a direct connection between the imine and the benzene ring in formula (3), or includes a carbon atom and a hydrogen atom.

According to the second aspect of the invention, the metal nanoparticle of the first aspect is further characterized in that the substituent is at least one substituent selected from the group consisting of an alkoxy group such as a methoxy group and an ethoxy group, and a halogen group such as chlorine and bromine.

According to the third aspect of the invention, the metal nanoparticle of the first or second aspect of the invention is further characterized in that said metal ion is any one of gold, silver, platinum, palladium, and nickel ions.

According to the fourth aspect of the invention, there is an electrode provided, which is characterized in that a substrate is coated on its surface with the metal nanoparticle of any one of the first, second, and third aspects of the invention.

According to the fifth aspect of the invention, there is a process of preparing the metal nanoparticle of any one of the first, second, and third aspects of the invention, characterized by comprising the steps of:

dispersing an aqueous solution of a metal salt in an organic solvent to obtain a dispersion, charging in said dispersion a solution of at least one cyclic phenylazomethine having at least one structure selected from formulae (1), (2) and (3) in Chemical Formula 1 and mixing them together, incorporating hydrogenated boron sodium as a reducing agent in the ensuing mixture and stirring them together, and drying the ensuing organic solution.

ADVANTAGES OF THE INVENTION

According to the first aspect of the invention, metal ions are detected by measuring a change of oxidation-reduction currents occurring when the cyclic phenylazomethine captures the metal ions. By use of the cyclic phenylazomethine having a clear-cut structure, the amount of metal ions held on the imine can be estimated with high accuracy. By using recurring units or the compounds of formulae (1) to (3) in any desired combination, it is possible to detect two or more metal ions.

According to the second aspect of the invention, if the electron donating/attracting action of the functional group such as an alkoxy group and a halogen group is used, it is then possible to change the oxidation-reduction potential of ions or coordination force to metal ions with the result that various metal ions can be detected.

The third aspect of the invention ensures that various metal nanoparticles can be prepared, and they may be applied not only to sensor materials but also to a variety of materials inclusive of catalysts and optical materials.

The fourth aspect of the invention ensures that modified electrodes can be prepared by a very simple process that involves coating alone without recourse to troublesome operations.

The fifth aspect of the invention ensures that the metal nanoparticle modified with a high-molecular or polymer material can be synthesized in one stage without recourse to awkward operations: by allowing the reducing agent to act on a mixture of the metal salt and the high-molecular material.

BRIEF DESCRIPTION OF THE DRAWINGS

FIG. 1 is a flowchart illustrative of exemplary process steps.

BEST MODE FOR CARRYING OUT THE INVENTION

Even when the exemplary metal ion is replaced by such a metal ion as coordinating to other cyclic phenylazomethine, similar metal nanoparticles could be obtained. For instance, there is the mention of silver, platinum, palladium, and nickel ions.

For starting metal substances other than metal chlorides, metal trifluoroacetates, metal bromides or the like may be used.

For organic solvents other than tetraoctylammonium bromide, chloroform, dichloromethane or the like may be used.

The cyclic phenylazomethine compound is at least one selected from the group consisting formulae (1), (2) and (3) including an imine and a benzene ring, as represented by Chemical Formula 1. Here $R^1$ and $R^2$ that may be identical or different are a hydrogen atom, and an aryl group (e.g., phenyl or tolyl group) or an alkyl group (e.g., methyl, ethyl, n-butyl, t-butyl, n-propyl or i-propyl group) that may or may not have a substituent; n is an integer of 2 or greater indicative of the degree of polymerization; m is an integer of 3 or greater indicative of the degree of polymerization, and R is a spacer that directly connects imines together in formulae (1) and (2), makes a direct connection between the imine and the benzene ring in formula (3), or includes a carbon atom and a hydrogen atom. The substituent, for instance, includes an alkoxy group such as methoxy and ethoxy, and a halogen group such as chlorine and bromine.

(Chemical Formula 1)

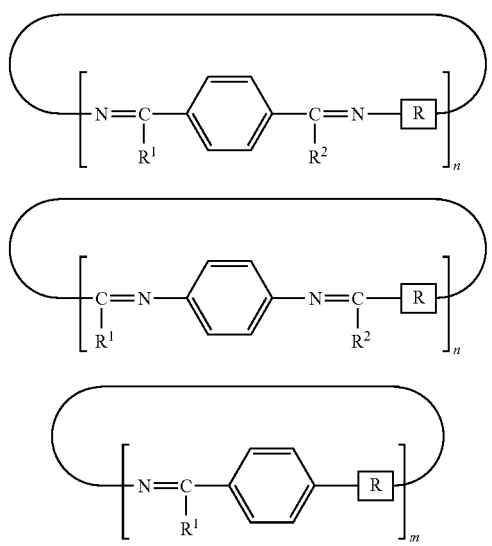

The present invention may be applied not only to the cyclic phenylazomethine compound exemplified in the following example but also to those set forth in Japanese Patent Application Nos. 2005-321913 and 2006-356392.

EXAMPLE (Preparation Process)

Cyclic phenylazomethine-modified metal nanoparticles are synthesized as follows.

78.8 mg of gold chloride ($HAuCl_4.3H_2O$) dissolved in 60 ml of water are placed in a 500-ml recovery flask.

After that, 218.7 mg of tetraoctylammonium bromide dissolved in 160 ml of toluene were added to and stirred with the solution. At this time, the aqueous layer turned into colorless and the organic layer turned into orange. 30 mg of cyclic phenylazomethine dissolved in 120 ml of toluene were added to and stirred with the solution at room temperature for about 10 minutes.

After that, 75.7 mg of hydrogenated boron sodium dissolved in 60 ml of water were added to and vigorously stirred with the solution at room temperature for 12 hours or longer.

Just after the addition of hydrogenated boron sodium, the organic layer turned into purple.

After stirring, the organic layer was extracted out, and the filtrate was concentrated and dried to obtain cyclic phenylazomethine-modified nanoparticles.

(UV Characteristics of Cyclic Phenylazomethine-modified Nanoparticles)

Figure 2:
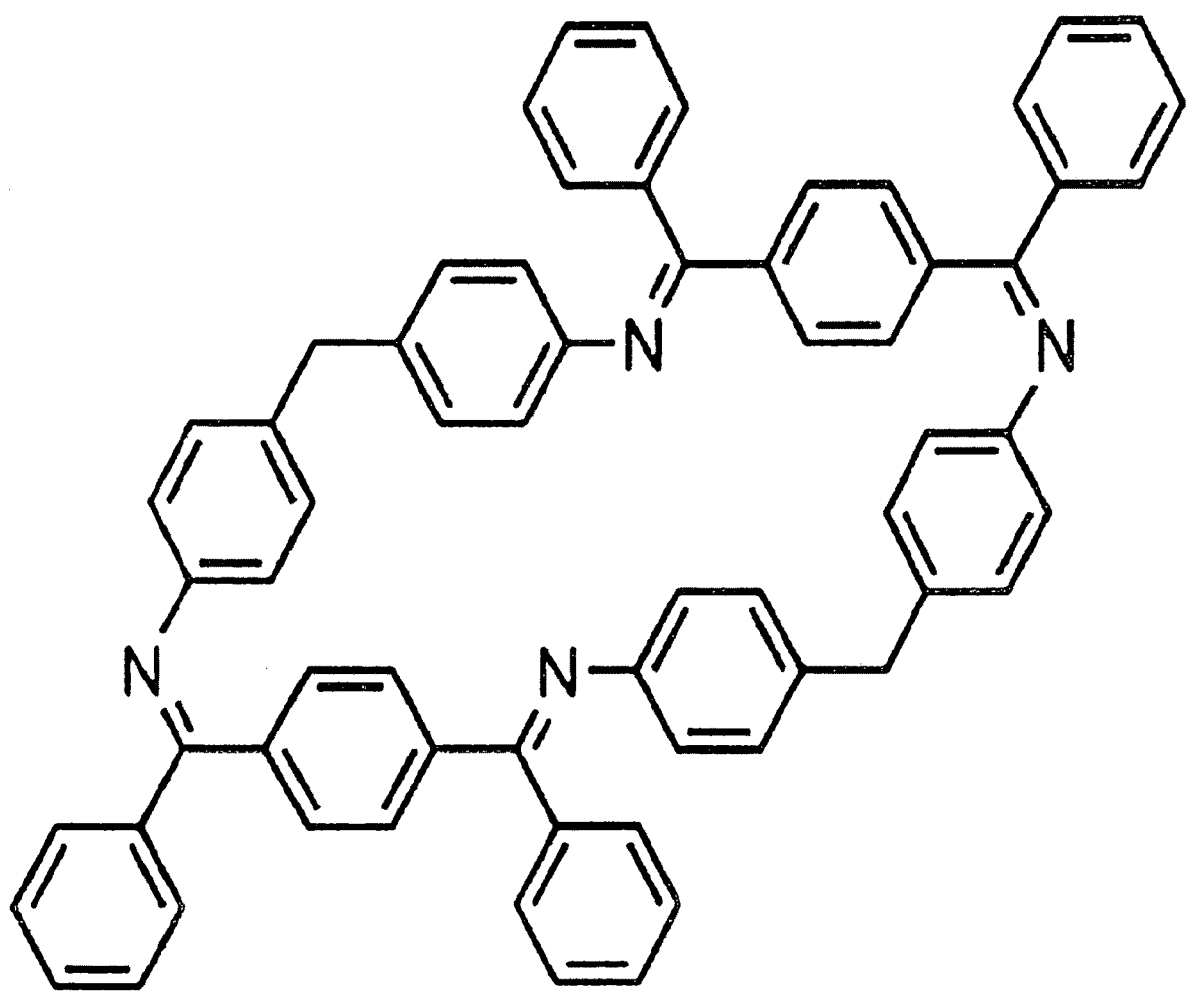
FIG. 2 is indicative of the chemical structure formula of an exemplary cyclic phenylazomethine.
Figure 3:
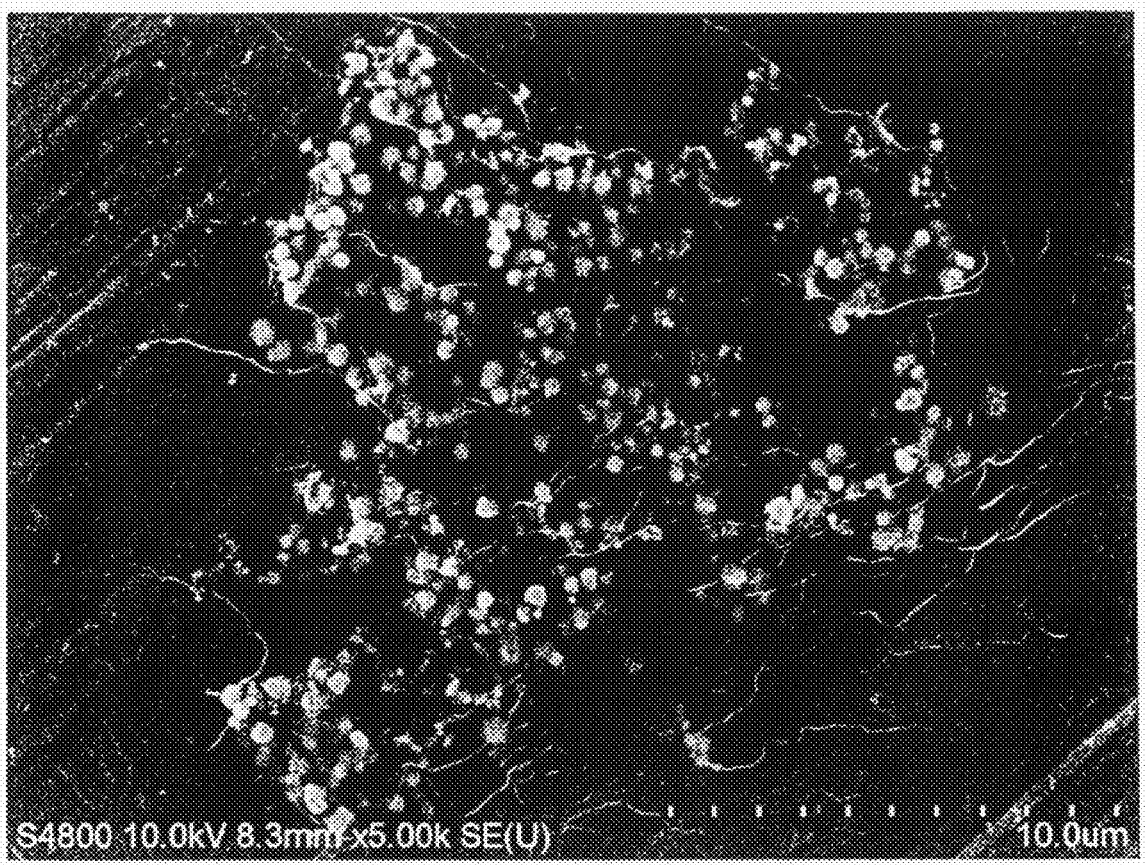
FIG. 3 is a SEM photograph taken of a metal nanoparticle modified with an exemplary cyclic phenylazomethine.
Figure 4:
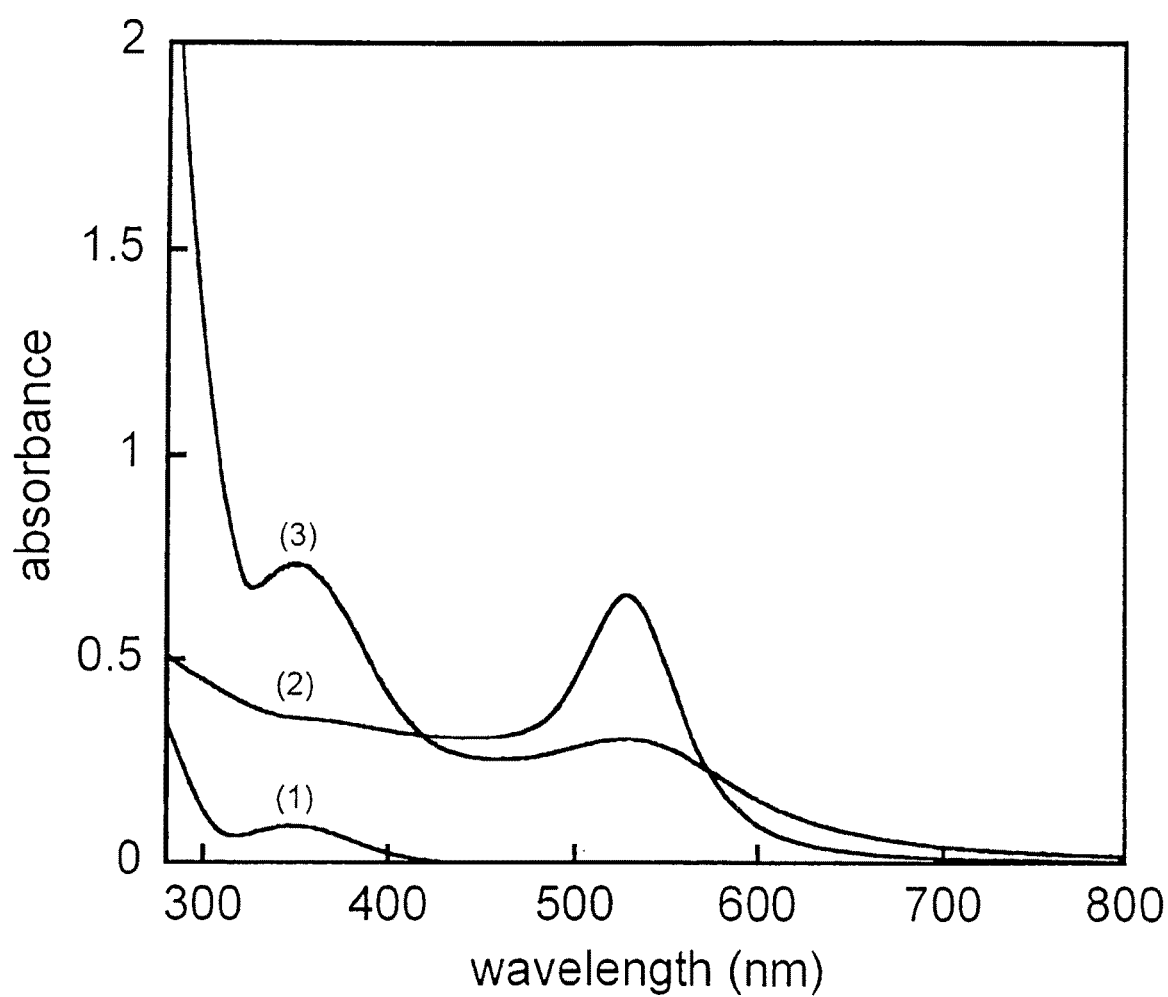
FIG. 4 is a graph indicative of the results of measuring UV spectra of a metal nanoparticle modified with an exemplary cyclic phenylazomethine.

The cyclic phenylazomethine-modified nanoparticles obtained by the above synthesis process were measured for UV spectra. The UV spectra of the cyclic phenylazomethine are shown together with those of comparative gold nanoparticles (without modification) in Table 1 and FIG. 4. The gold nanoparticles are characterized by having an SPR peak around 500 nm. On the other hand, the cyclic phenylazomethine has a peak around 350 nm. As a result of measurement of UV spectra of the cyclic phenylazomethine-modified nanoparticles, it has been found that there are two peaks around 500 nm coming from the gold nanoparticles and around 350 nm coming from the cyclic phenylazomethine.

TABLE 1

| | Peak Value |
|---|---|
| (1) Cyclic phenylazomethine | about 350 nm |
| (2) Gold nanoparticles (without modification) | about 530 nm |
| (3) Cyclic phenylazomethine-modified gold nanoparticles | about 350 nm and about 530 nm |

(CV/DPV Characteristics of the Cyclic Phenylazomethine-modified Gold Nanoparticles)

The cyclic phenylazomethine-modified nanoparticles obtained by the above synthesis process were coated on an electrode for CV and DPV measurements. For that electrode a GCE glassy carbon electrode was used. For a counter electrode a Pt counter electrode (made by BAS) was used, and for a reference electrode AG/AG$^+$/ACN/TBAP (made by BAS) for organic solvents was used. For a solvent acetonitrile was used, and for a carrier electrolyte tetrabutylammonium tetrafluoroboroate (0.2M) was used. Measurements were carried out with or without 10 mM of tin (II) chloride. In the case of 10 mM tin chloride dissloved, a one-step oxidation-reduction wave was observed. In the case of DPV measurements, too, there was an oxidation-reduction wave found around −0.5 V with the dissolution of 10 mM tin chloride.

Figure 5:
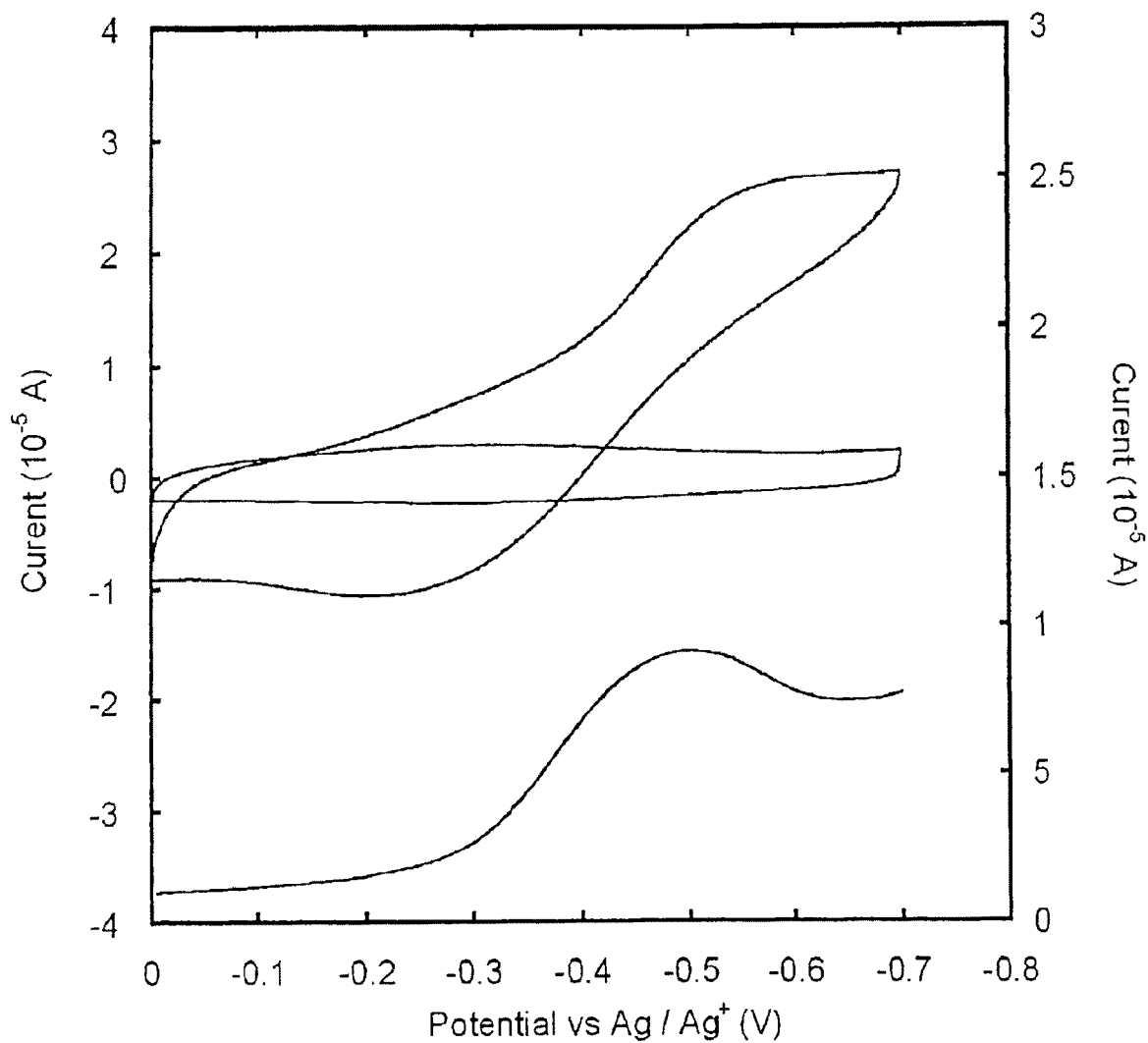
FIG. 5 shows a CV chart measured in a solvent having an exemplary $SnCl_2$ dissolved in it, a CV chart measured in a solvent in which $SnCl_2$ is not dissolved, and a DPV chart measured in a solvent having 10 mM of $SnCl_2$ dissolved in it.
Figure 6:
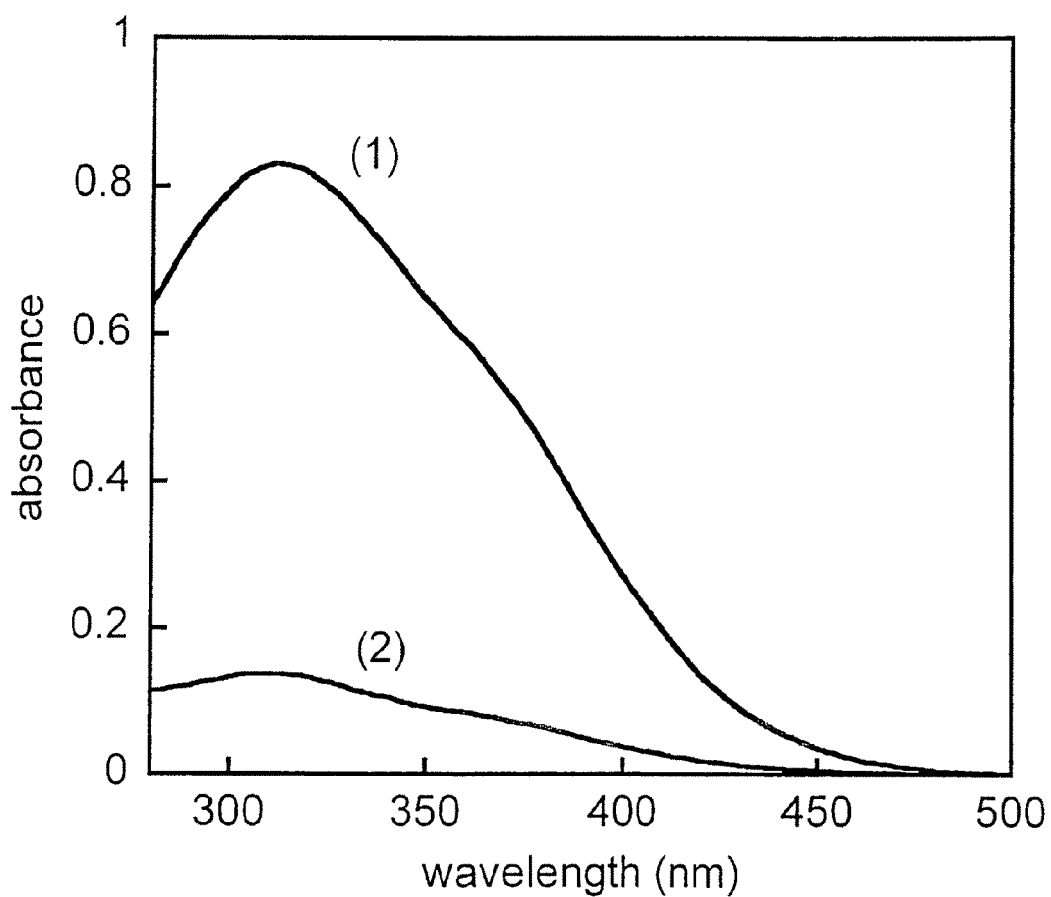
FIG. 6 is a graph indicative of an exemplary adhesive force (solubility).

These measurements are shown in FIG. 5.

Between the coating of the electrode with the cyclic phenylazomethine alone and the coating of the electrode with the cyclic phenylazomethine-modified gold nanoparticles, there was a difference in the amount of dissolution of the cyclic phenylazomethine in the measuring solvent: it has emerged that the amount of dissolution can be markedly reduced by modification of gold particles with the cyclic phenylazomethine.

Then, studies were made of differences in the solubility in 1 mM of the cyclic phenylazomethine and the cyclic phenylazomethine-modified gold nanoparticles in a tin chloride solution.

1 mM of tin chloride was dissolved in acetonitrile, and the cyclic phenylazomethine and the cyclic phenylazomethine-modified gold nanoparticle were dissolved in the solution for the measurement of UV-vis absorption.

The concentration upon measurement was 20 mM of the cyclic phenylazomethine, and the weight of the cyclic phenylazomethine-modified gold nanoparticles in the cyclic phenylazomethine content of 20 μM was figured out and measured out of the weight ratio at the time of synthesis.

A peak around 310 nm is one that goes high by the formation of a complex from imine in the cyclic phenylazomethine and tin chloride. From comparisons of such peaks, the difference in the solubility of the cyclic phenylazomethine and the cyclic phenylazomethine-modified nanoparticles in the tin chloride solution can be seen.

As a consequence, the cyclic phenylazomethine takes a value of 0.83 whereas the cyclic phenylazomethine-modified gold nanoparticles takes a value of 0.14, indicating that the cyclic phenylazomethine-modified nanoparticles are about 1/6 in solubility as low as the cyclic phenylazomethine. It follows that durability or robustness is about 6 times as high.

APPLICABILITY TO THE INDUSTRY

The inventive cyclic phenylazomethine-modified gold nanoparticles may be used as a sensor material for sensing or recovering harmful metals, rare metals or the like, for the purposes of sensing biomolecules (proteins, amino acids or the like) and the concentrations of acids, and so on.

What we claim is:

1. A metal nanoparticle, modified by a cyclic phenylazomethine compound having a structure represented by Chemical Formula 1:

(Chemical Formula 1)

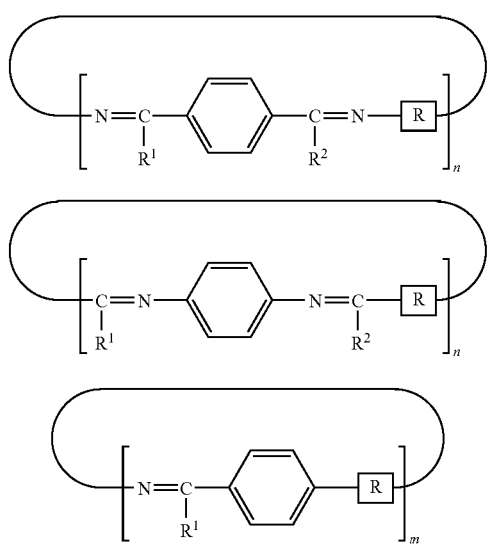

wherein the cyclic phenylazomethine compound is at least one compound selected from the group consisting of formulae (1), (2) and (3) including imine and a benzene ring; where
$R^1$ and $R^2$ that may be identical or different are a hydrogen atom or a substituted or unsubstituted aryl or alkyl group;
n is an integer of 2 or greater indicative of a degree of polymerization;
m is an integer of 3 or greater indicative of a degree of polymerization; and
R is a spacer that directly connects imines together in formulae (1) and (2), makes a direct connection between the imine and the benzene ring in formula (3), or includes a carbon atom and a hydrogen atom.

2. The metal nanoparticle according to claim 1 wherein said substituted aryl or alkyl group has at least one substituent selected from the group consisting of an alkoxy group such as a methoxy group and an ethoxy group, and a halogen group such as chlorine and bromine.

3. The metal nanoparticle according to claim 1, wherein said metal nanoparticle is selected from the group consisting of gold, silver, platinum, palladium, and nickel particle.

4. An electrode, comprising:
a substrate,
wherein the substrate is coated on a surface of the substrate with the metal nanoparticle of claim 1.

5. A process of preparing the metal nanoparticle of claim 1, comprising:
dispersing an aqueous solution of a metal salt in an organic solvent to obtain a dispersion,
mixing said dispersion and a solution of at least one cyclic phenylazomethine having at least one structure selected from formulae (1), (2) and (3) represented by chemical formula 1 together to obtain a mixture of said dispersion and the solution of at least one cyclic phenylazomethine,
mixing and stirring said mixture with hydrogenated boron sodium as a reducing agent together to obtain an organic solution, and
drying the organic solution.

6. The metal nanoparticle according to claim 1, wherein the cyclic phenylazomethine compound has a chemical structure (4):

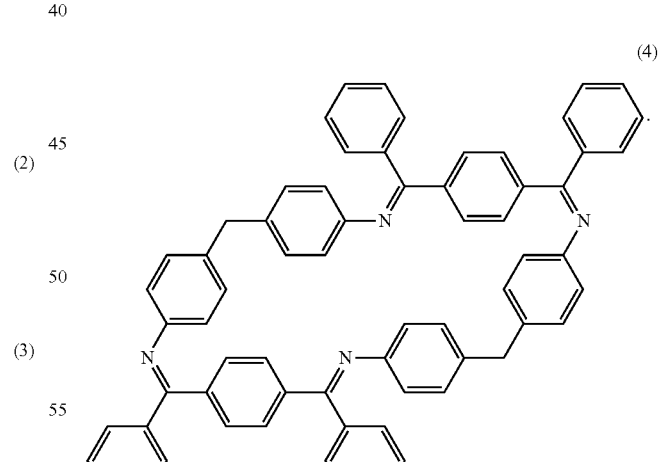

* * * * *